(12) United States Patent
Doan et al.

(10) Patent No.: US 11,307,600 B2
(45) Date of Patent: Apr. 19, 2022

(54) SYSTEMS AND METHODS FOR REGULATING TEMPERATURES OF POOL SYSTEMS

(71) Applicant: Poolside Tech, LLC, New Hope, PA (US)

(72) Inventors: William R. Doan, New Hope, PA (US); Stan Reznik, Riverwoods, IL (US)

(73) Assignee: Poolside Tech, LLC, New Hope, PA (US)

(*) Notice: Subject to any disclaimer, the term of this patent is extended or adjusted under 35 U.S.C. 154(b) by 0 days.

(21) Appl. No.: 17/210,020

(22) Filed: Mar. 23, 2021

(65) Prior Publication Data

US 2021/0341956 A1    Nov. 4, 2021

Related U.S. Application Data

(60) Provisional application No. 63/019,019, filed on May 1, 2020.

(51) Int. Cl.
*G05D 23/19* (2006.01)
*G05D 23/32* (2006.01)
(Continued)

(52) U.S. Cl.
CPC ..... *G05D 23/1917* (2013.01); *G05B 19/4155* (2013.01); *G05D 23/1925* (2013.01);
(Continued)

(58) Field of Classification Search
CPC .............. G05D 23/1917; G05D 23/32; G05D 23/1925; G05D 23/30; G05B 19/4155; G05B 13/021; G05B 2219/50333
See application file for complete search history.

(56) References Cited

U.S. PATENT DOCUMENTS 3,819,297 A    6/1974  East
4,090,532 A    5/1978  Story
(Continued)

FOREIGN PATENT DOCUMENTS

WO    2021050932 A1    3/2021

OTHER PUBLICATIONS

International Search Report and Written Opinion, International Patent Application No. PCT/US2021/026587, dated Jul. 20, 2021.

*Primary Examiner* — Kenneth M Lo
*Assistant Examiner* — Jonathan Michael Skrzycki
(74) *Attorney, Agent, or Firm* — Saul Ewing Arnstein & Lehr LLP; Brian R. Landry (57) ABSTRACT

One aspect of the invention provides a system including: at least one temperature-regulation element in fluidic communication with a fluid repository; and a processor in electronic communication with the at least one temperature-regulation element. The processor can: determine a temperature threshold value for a volume of fluid contained by the fluid repository; calculate an amount of solar radiation to which the volume of fluid is exposed; calculate, from the amount of solar radiation and a set of temperature-regulation factors, a time period for reaching the temperature threshold value for the volume of fluid; identify a desired use time for the volume of fluid; and activate the at least one temperature-regulation element according to the time period and the desired use time. The set of temperature-regulation factors includes at least a current temperature of the fluid volume and an energy-transfer rate for the temperature-regulation element.

15 Claims, 6 Drawing Sheets

(51) Int. Cl.
*G05B 13/02* (2006.01)
*G05B 19/4155* (2006.01)
*G05D 23/30* (2006.01)

(52) U.S. Cl.
CPC ............. *G05D 23/30* (2013.01); *G05D 23/32* (2013.01); *G05B 13/021* (2013.01); *G05B 2219/50333* (2013.01)

(56) References Cited

U.S. PATENT DOCUMENTS

| | | | |
|---|---|---|---|
| 4,322,297 A * | 3/1982 | Bajka | B01D 37/00 210/742 |
| 5,483,227 A | 1/1996 | Kuo et al. | |
| 6,670,584 B1 | 12/2003 | Azizeh | |
| 7,931,447 B2 | 4/2011 | Levin et al. | |
| 8,131,497 B2 | 3/2012 | Steinberg et al. | |
| 8,313,305 B2 | 11/2012 | Bevington | |
| 8,800,473 B1 | 8/2014 | Deverse et al. | |
| 9,031,702 B2 | 5/2015 | Pruchniewski et al. | |
| 10,219,975 B2 | 3/2019 | Potucek et al. | |
| 2003/0163865 A1 | 9/2003 | Huang | |
| 2004/0230344 A1 * | 11/2004 | Gallupe | E04H 4/129 700/300 |
| 2005/0222786 A1 | 10/2005 | Tarpo et al. | |
| 2006/0272830 A1 | 12/2006 | Fima | |
| 2007/0154319 A1 | 7/2007 | Stiles et al. | |
| 2008/0078100 A1 | 4/2008 | Kim et al. | |
| 2008/0148592 A1 | 6/2008 | Kim et al. | |
| 2008/0313921 A1 | 12/2008 | Oh et al. | |
| 2008/0313923 A1 | 12/2008 | Oh et al. | |
| 2009/0139110 A1 | 6/2009 | Oh et al. | |
| 2009/0151801 A1 | 6/2009 | Gorman et al. | |
| 2009/0204263 A1 * | 8/2009 | Love | G05D 23/19 700/282 |
| 2011/0315262 A1 | 12/2011 | Butler et al. | |
| 2012/0073040 A1 | 3/2012 | Cohen | |
| 2012/0123594 A1 | 5/2012 | Finch et al. | |
| 2013/0327403 A1 | 12/2013 | Jensen | |
| 2014/0305525 A1 | 10/2014 | Le Moing et al. | |
| 2015/0278930 A1 | 10/2015 | Potucek et al. | |
| 2016/0153456 A1 | 6/2016 | Stiles et al. | |
| 2017/0209338 A1 | 7/2017 | Potucek et al. | |
| 2018/0240322 A1 | 8/2018 | Potucek et al. | |
| 2019/0204203 A1 | 7/2019 | Nix | |
| 2019/0331363 A1 * | 10/2019 | Peng | F24H 9/2007 |
| 2020/0319621 A1 * | 10/2020 | Roy | A61H 33/00 |
| 2021/0047853 A1 * | 2/2021 | Gamboa | E04H 4/1245 |

* cited by examiner

SYSTEMS AND METHODS FOR REGULATING TEMPERATURES OF POOL SYSTEMS

CROSS-REFERENCE TO RELATED APPLICATION

This application claims the benefit of priority under 35 U.S.C. § 119(e) to U.S. Provisional Patent Application Ser. No. 63/019,019, filed May 1, 2020. The entire content of this application is hereby incorporated by reference herein.

BACKGROUND OF THE INVENTION

Pool systems (e.g., swimming pools, hot tubs, spas, and the like) typically include temperature regulation systems for heating and/or cooling the pool water, such as electric heaters, solar heaters, electric chillers, the like. However, these temperature regulation systems are operated inefficiently, such that the systems expend more energy and cost more to operate than what is required to effectively heat and/or cool the pool system.

SUMMARY OF THE INVENTION

One aspect of the invention provides a system including: at least one temperature-regulation element configured for fluidic communication with a fluid repository; and a processor in electronic communication with the at least one temperature-regulation element. The processor is configured to: determine a temperature threshold value for a volume of fluid contained by the fluid repository; calculate an amount of solar radiation to which the volume of fluid is exposed; calculate, from the amount of solar radiation and a set of temperature-regulation factors, a time period for reaching the temperature threshold value for the volume of fluid, wherein the set of temperature-regulation factors comprises at least a current temperature of the fluid volume and an energy-transfer rate for the temperature-regulation element; identify a desired use time for the volume of fluid; and activate the at least one temperature-regulation element according to the time period and the desired use time.

This aspect of the invention can have a variety of embodiments. The system can further include a fluid flow pump in fluidic communication with the temperature-regulation element, and in electronic communication with the processor. The set of temperature-regulation factors can further include a power output value or rotations per minute value of the fluid flow pump, wherein the processor is further configured to activate the fluid flow pump according to the time period and the desired use time. The set of temperature-regulation factors can further include an operating condition of the fluid flow pump, wherein the processor is further configured to determine a degradation of the operating condition of the fluid flow pump.

The at least one temperature-regulation element can further include a gas heater, an electric heater, a solar heater, an electric chiller, or a combination thereof. The at least one temperature-regulation element can further include at least two temperature-regulation elements, and wherein the set of temperature-regulation factors further comprises an energy-transfer rate for each of the temperature-regulation elements, and an energy-expenditure rate for operating each of the temperature-regulation elements. The processor can be further configured to activate a subset of the at least two temperature-regulation elements according to the time period and the desired use time.

The processor can be further configured to: receive an electronic weather forecast; and calculate the amount of solar radiation from the electronic weather forecast.

The system can further include a temperature gauge in electronic communication with the processor, wherein the set of temperature-regulation factors further comprises ambient temperature factors, wherein the processor is further configured to: receive temperature measurements from the temperature gauge; and determine the ambient temperature factors from the temperature measurements. The processor can be further configured to determine a schedule of ambient temperature factors over a predefined period of time from the temperature measurements.

The processor can be further configured to determine a set of active use mitigation factors for the volume of fluid, wherein the identifying the desired use time is further according to the set of active use mitigation factors. The set of active use mitigation factors can include a predefined geographical distance, wherein the processor is further configured to determine a user is a predefined geographical distance from the fluid repository. The set of active use mitigation factors can include an active use schedule for the fluid repository and configured by a user, and wherein the processor is further configured to determine an inactive schedule for the fluid repository from the active use schedule. The set of active use mitigation factors can include inclement weather conditions, wherein the processor is further configured to: receive an electronic weather forecast; and determine the inclement weather conditions from the electronic weather forecast. The inclement weather conditions can be determined relative to previously submitted user preferences.

The set of temperature-regulation factors can further include a schedule of energy rate pricing for a property on which the system resides, wherein the processor is further configured to receive the schedule of energy rate pricing electronically.

The processor can be further configured to determine, from the set of temperature-regulation factors, a cost-optimal procedure for the at least one temperature-regulation element for reaching the temperature threshold value, wherein the at least one temperature-regulation element is activated according to the cost-optimal procedure.

The at least one temperature-regulation element can be configured to be in fluidic communication with another fluid repository containing another volume of fluid, wherein the processor is configured to: determine another time period for reaching another temperature threshold value for the other volume of fluid, wherein the activating the at least one temperature-regulation element is further according to the other time period. The system can further include a valve in fluidic communication with the fluid repository and the other fluid repository, and in electronic communication with the processor, wherein the processor is further configured to actuate the valve for reaching the temperature threshold value, the other temperature threshold value, or both. The processor can be further configured to: identify a temperature difference between the fluid volume and the other fluid volume, and actuate the valve to flow fluid from the fluid volume into the other fluid volume, or vice versa.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Temperature Regulation System

In some cases, an effective technique to reduce energy consumption and costs associated with pool temperature regulation is to keep the pool water at the lowest possible temperature. Heat loss of the water increases significantly and non-linearly with the difference to the ambient air temperature. An important consideration in pool temperature regulation is the amount of time it takes to reheat the water to the temperature that users desire to swim in. In smaller bodies of water, such as a spa, water may be heated at a rate of 40° F. per hour or higher. Large bodies of water such as pools will only typically gain 1-2° F. per hour. For this reason, it may take several hours to get a pool warm enough for swimming.

Systems and techniques for efficient pool temperature regulation are described herein. A temperature regulation system can monitor a performance of heating system components. For example, the amount of time required to raise the temperature of a coupled pool or similar fluid repository by a set amount can be recorded (e.g., by a control system). Other factors such as ambient air temperature can also be monitored. Factors such as availability of direct solar radiation can also be monitored and/or recorded. By monitoring the capabilities of the system, along with an anticipated use time by a user, the system can calculate the latest possible time to activate heating component(s). Utility cost can also be monitored to achieve a cost-effective scheduling.

For example, consider a scenario where heating of the water requires 6 hours of pool pump activation. Assuming a 3 KW pump and $0.10/KWH peak utility rate and $0.05/KWH off-peak utility rate, pump runtime can be estimated at $1.80 during the day (on peak) or $0.90 at night (off peak). If heating the water earlier at night results in additional heat loss and additional cost of energy expenditure, the user may still save money on electric usage.

Fluid Flow Pump

Figure 1:
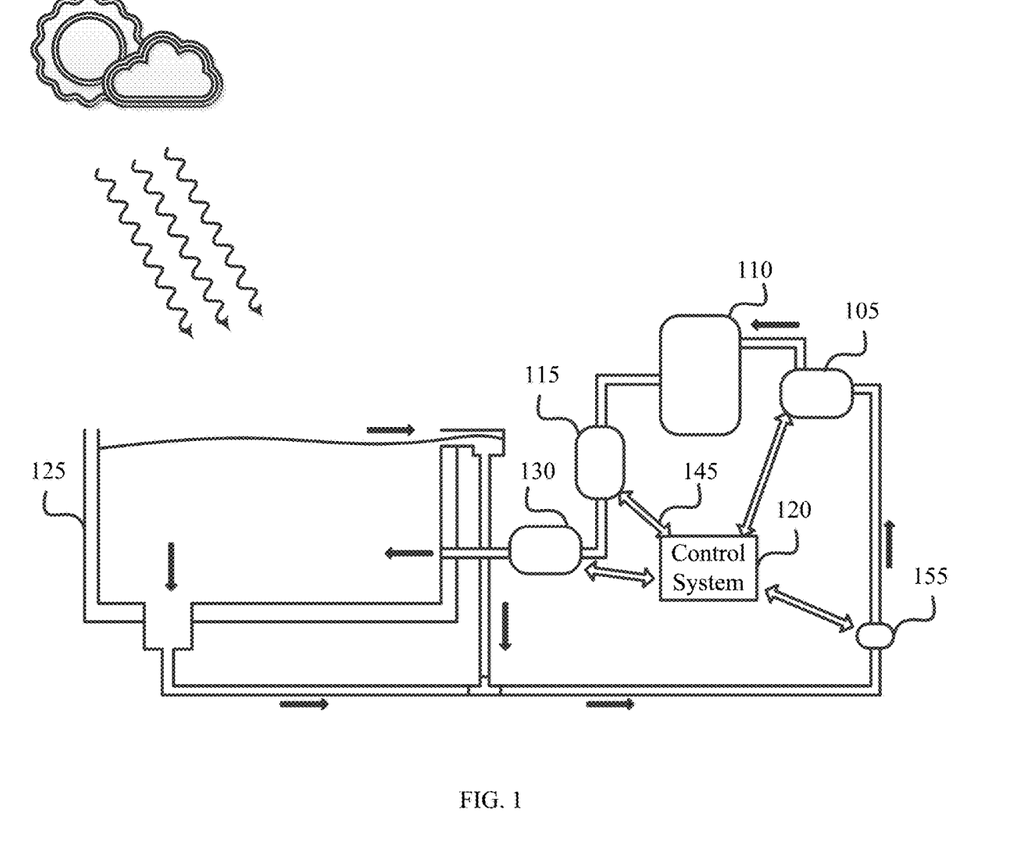
FIG. 1 depicts a temperature regulation system for a pool according to embodiments of the claimed invention.

FIG. 1 depicts a temperature regulation system for a fluid repository in accordance with an embodiment of the claimed invention. The maintenance system can include a fluid flow pump 105. The pump, when activated, can flow water or other fluid through the maintenance system. In some cases, the fluid flow pump 105 can be a single-stage pump that operates at a static power output and/or rotational speed (e.g., in rpm). In other cases, the fluid flow pump can be a variable speed pump. In these cases, the pump can be activated at variable flow rates. For example, a controller or control system can manage the rotations per minute (rpm) of a pump motor, which can be directly correlated to the power output of the pump. Additionally, as the pump can include a maximum rpm or power output, a controller of control system can activate the pump at rpm or and/or power fractions of the pump's maximum output. Examples of variable speed pumps can include, but are not limited to HAYWARD ECOSTAR, HAYWARD TRISTAR, JANDY EPUMP, PENTAIR INTELLIFLO VS, and the like.

Flow Rate Sensor

The temperature regulation system can also include a flow rate sensor 115. The flow rate sensor 115 can be in fluidic communication with the fluid flow pump 105, for example via a fluid channel such as piping. The flow rate sensor 115 can measure flow rate based on the amount of fluid passing through the sensor and can transmit flow rate measurement signals to a controller or control system. In some cases, the flow rate sensor 115 can be "downstream" of the fluid flow pump 105, such that fluid flowing from the pump 105 can flow towards the flow rate sensor 115.

In some cases, the flow rate sensor 115 can include "smart" sensors, such as a flow rate turbine or a piezo-electric flow meter. In the case of a flow rate turbine, the turbine can be pushed by fluid flowing through the fluid channel or pipe, The pushed turbine can generate an amount of electricity based on the speed of the fluid flow, where a processor can then identify the flow rate from the amount of electricity generated. In the case of piezo-electric flow meters, flow rate can be determined through measuring the Doppler effect and/or propagation time of ultrasonic waves generated by the flow meter. In any of these smart flow rate sensor cases, the flow rate sensor may be coupled to an intermediary processor, which can process received measurements and signals to generate flow rate values and the like. This intermediary processor can communicate electronically to the controller or control system of the pool maintenance system.

In some cases, the flow rate sensor 115 can include a minimal flow rate registration threshold. For example, the flow rate sensor 115 can include a flow switch. The flow switch can include a paddle positioned within the fluid channel. When the flow rate sensor experiences a sufficient flow rate of the flowing fluid, the paddle is "pushed" or deflected by the flowing fluid. An electronic circuit can be completed (e.g., closed) when the paddle is in the pushed or deflected position, and can be open otherwise. The closed circuit can transmit an electrical communication to a controller or control system, such that the controller or control system can determine when a fluid flow rate exceeds the flow rate sensor's minimal flow rate registration threshold. Likewise, the controller or control system can determine when the fluid flow rate falls below the minimal flow rate registration threshold, as the controller or control system can determine that the system has not received an electrical communication from the flow rate sensor. Examples of flow rate sensors can include, but are not limited to, HAYWARD GLX-FLO-RP, HAYWARD AQUARITE, PENTAIR ITELLICHLOR, JANDY AQUAPURE, and the like.

Fluid Filter

The temperature regulation system can also include a fluid filter 110. The fluid filter 110 can filter particles, debris, and the like, from a fluid flowing through the maintenance system. Examples of fluid filters of the temperature regulation system can include, but are not limited to HAYWARD PRO SERIES, HAYWARD SWIMCLEAR, JANDY PRO SERIES CV, JANDY CL CARTRIDGE FILTER, PENTAIR CLEAN and CLEAR PLUS, PENTAIR EASY CLEAN, and the like.

Control System

Figure 2:
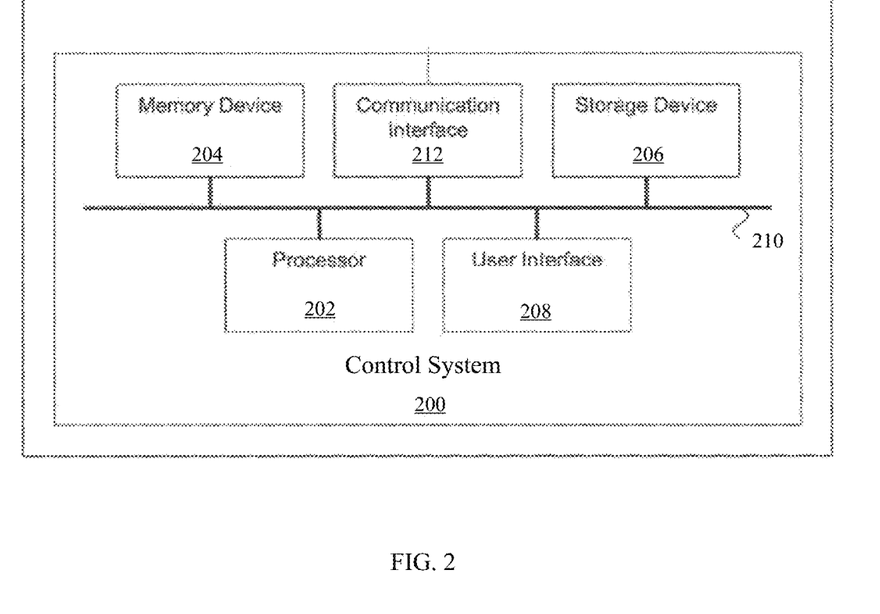
FIG. 2 depicts a control system according to embodiments of the claimed invention.

The temperature regulation system can also include a control system 120. For example, a control system 200 is depicted in FIG. 2. The control system can be in electronic communication with the variable speed pump 105, the flow rate sensor 115, and/or the fluid heater/cooler 130. In some cases, the control system can transmit activation communications to the variable speed pump, such as a percentage of maximum power output or rpms for the pump to operate under. Further, the control system can in some cases receive notification communications from the pump, the flow rate sensor, the fluid heater/cooler, or a combination thereof. For example, the pump can transmit communications notifying the control system of the pump activating at a given power output or rpm, or an activation command to the fluid heater/cooler. The flow rate sensor can transmit flow rate communications to the control system, such as when the flow rate sensor is in a deflected or pushed position.

In some cases, the control system 120 can also be in electronic communication with temperature measuring devices. For example, the control system 120 can be in electronic communication with a thermistor, such as thermistor 155. The control system 120 can receive resistance measurements, temperature measurements, or both, from the thermistor. Additionally or alternately, the control system can be in electronic communication with an air temperature thermometer. In some cases, air temperature measurements can be received in an electronic weather forecast.

The control system 120 can be an electronic device programmed to control the operation of the temperature regulation system to achieve a desired result. The control system 120 can be programmed to autonomously carry out a system temperature regulation regimen without the need for input (either from feedback devices or users) or can incorporate such inputs. The principles of how to use feedback (e.g., from a flow rate sensor) in order to modulate operation of a component are described, for example, in Karl Johan Astrom & Richard M. Murray, *Feedback Systems: An Introduction for Scientists & Engineers* (2008).

The control system 120 can be a computing device such as a microcontroller (e.g., available under the ARDUINO® OR IOIO™ trademarks), general purpose computer (e.g., a personal computer or PC), workstation, mainframe computer system, and so forth. An exemplary control system is illustrated in FIG. 2. The control system ("control unit") 200 can include a processor device (e.g., a central processing unit or "CPU") 202, a memory device 204, a storage device 206, a user interface 208, a system bus 210, and a communication interface 212.

The processor 202 can be any type of processing device for carrying out instructions, processing data, and so forth.

The memory device 204 can be any type of memory device including any one or more of random access memory ("RAM"), read-only memory ("ROM"), Flash memory, Electrically Erasable Programmable Read Only Memory ("EEPROM"), and so forth.

The storage device 206 can be any data storage device for reading/writing from/to any removable and/or integrated optical, magnetic, and/or optical-magneto storage medium, and the like (e.g., a hard disk, a compact disc-read-only memory "CD-ROM", CD-ReWritable CDRW," Digital Versatile Disc-ROM "DVD-ROM", DVD-RW, and so forth). The storage device 206 can also include a controller/interface for connecting to the system bus 210. Thus, the memory device 204 and the storage device 206 are suitable for storing data as well as instructions for programmed processes for execution on the processor 202.

The user interface 208 can include a touch screen, control panel, keyboard, keypad, display or any other type of interface, which can be connected to the system bus 210 through a corresponding input/output device interface/adapter.

The communication interface 212 can be adapted and configured to communicate with any type of external device, or with other components of the temperature regulation system. For example, double-lined arrows, such as the arrow 145, can illustrate electronic communication between the control system 120 of FIG. 1 and another component of the pool temperature regulation system (e.g., the variable speed pump 105). The communication interface 212 can further be adapted and configured to communicate with any system or network, such as one or more computing devices on a local area network ("LAN"), wide area network ("WAN"), the Internet, and so forth. The communication interface 212 can be connected directly to the system bus 210 or can be connected through a suitable interface.

The control system 200 can, thus, provide for executing processes, by itself and/or in cooperation with one or more additional devices, that can include algorithms for controlling components of the pool temperature regulation system in accordance with the claimed invention. The control system 200 can be programmed or instructed to perform these processes according to any communication protocol and/or programming language on any platform. Thus, the processes can be embodied in data as well as instructions stored in the memory device 204 and/or storage device 206, or received at the user interface 208 and/or communication interface 212 for execution on the processor 202.

Pool Basin

The temperature regulation system can be coupled to a liquid repository 125, such as a pool basin, a spa basin, a hot tub basin, and the like. The coupling can be via fluidic channels, such as water piping and the like. Further, the dimensions and geometrical shapes of a coupled basin can vary, and one skilled in the art would understand different basin configurations can be coupled to the maintenance system.

In some cases, the temperature regulation system can be configured to couple to the fluid repository via an intake and outtake channels. For example, fluid channels can couple the fluid repository to the fluid filter, and fluid channels can couple the fluid repository to the flow rate sensor and/or the variable speed pump. Yet in some cases, the maintenance system can be fluidically coupled to the fluid repository in a recycling configuration, such that fluid is recycled from the fluid repository, through the maintenance system, and back to the fluid repository.

In some cases, the temperature regulation system can be fluidically coupled to multiple fluid repositories. For example, the temperature regulation system can be fluidically coupled to both a pool basin and a spa basin. Piping can couple each repository various aspects of the temperature regulation system. For example, each repository can include intake and outtake channels, which can allow fluid to flow between the corresponding repository and the fluid flow pump, the fluid filter, the fluid flow sensor, and the like, of the temperature regulation system.

Fluid Heater/Cooler

The temperature regulation system can also include fluid heater/coolers 130. The heater/cooler 130 can be fluidically coupled the flow pump 105 and can be configured to be fluidically coupled to the fluid repository 125. Further, the heater/cooler 130 can be in electronic communication with the control system 120. When activated, the heater/cooler 130 can alter the temperature of the fluid flowing through the heater/cooler 130.

The heater/cooler 130 can rely on a variety of energy sources. For example, the heater/cooler can be an electric heater or cooler, where the heat source is electrical. In some examples, the heater/cooler can be a natural gas heater, where the heat source is gas. In yet other examples, the heater/cooler can be a solar heater, where the heat source is solar. Further, the temperature regulation system can include a variety of heaters and/or coolers, where each heater and cooler is fluidically coupled to the fluid flow pump and configured to be coupled to a fluid repository.

Temperature Gauge

The temperature regulation system can also include temperature gauge(s). For example, a thermocouple or thermistor 155 can be coupled to the temperature regulation system. The thermistor can be coupled "in-line," such that the thermistor is installed in the fluidic piping and is exposed to the fluid flowing through the piping. The thermistor 155 can measure the temperature (e.g., through the temperature-dependent resistance of the thermistor) of the flowing fluid and transmit these measurements and/or resistance measurements to the control system 120. Additionally or alternatively, the temperature regulation system can include an air temperature gauge, which can measure the ambient temperature of the surrounding air in proximity to the temperature regulation system or fluid repository. In still other embodiments, the controller can obtain ambient air temperature for a region from a weather service via the internet or other network.

Temperature Regulation Parameters

Figure 3:
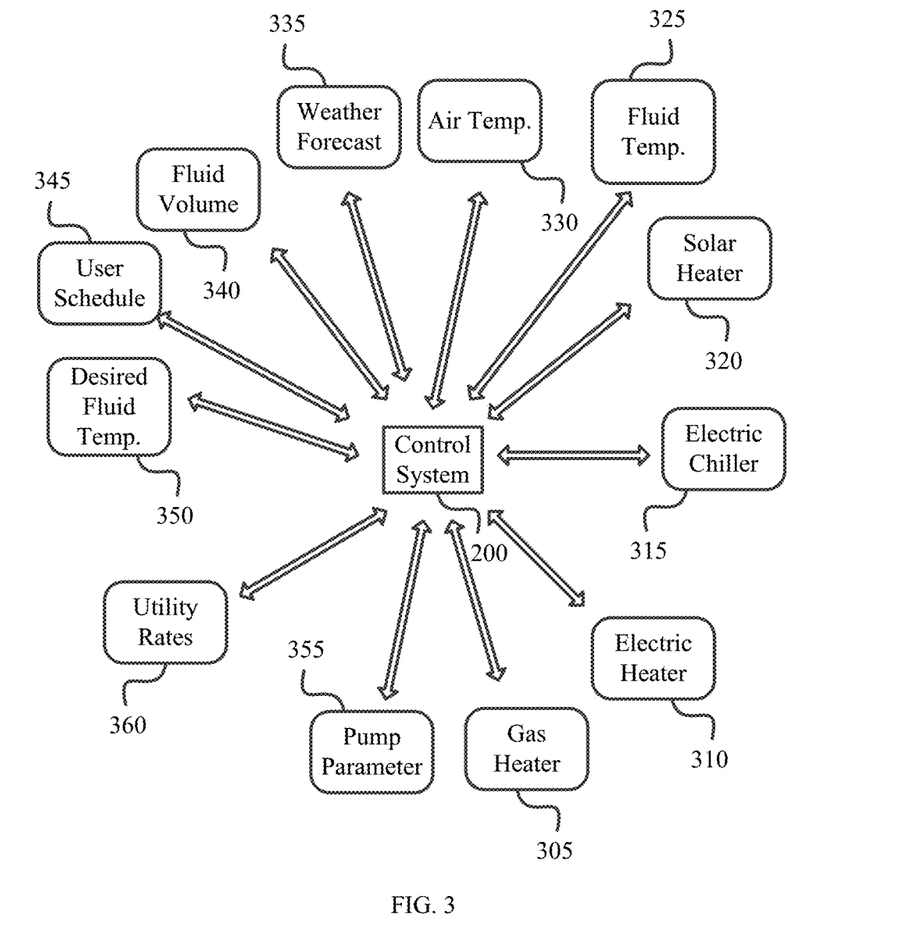
FIG. 3 depicts various data inputs for a control system according to embodiments of the claimed invention.

The temperature regulation system can monitor various parameters that affect the temperature of a fluid volume contained by a fluid repository, as well as associated costs. Further, FIG. 3 depicts the various parameters that the control system can monitor. These various parameters are discussed in more detail below.

Heaters

The temperature regulation system can identify if one or more heaters are components of the system (e.g., heaters 305, 310, and 320). In some cases, this identification can be accomplished by the system receiving user input, such as a make and model number of the heater. The system can also include other performance parameters of a heater. For example, the system can receive information corresponding to power output, thermal conductivity rates, etc., of the respective heater. These parameters may be stored previously by the system (e.g., via a spreadsheet at the time of manufacture), or in some cases, the system can retrieve these parameters electronically (e.g., through a website).

Chillers

Likewise, the temperature regulation system can identify one or more chillers are components of the system (e.g., chiller 315). In some cases, this identification can be accomplished by the system receiving user input, such as a make and model number of the chiller. The system can also receive information corresponding to power output, thermal conductivity rates, etc., of the respective chiller. These parameters may be stored previously by the system (e.g., via a spreadsheet at the time of manufacture), or in some cases, the system can retrieve these parameters electronically (e.g., through a website).

Fluid Temperature

The temperature regulation system can monitor the temperature of the fluid volume contained by a coupled fluid repository (e.g., fluid temperature 325). For example, the temperature regulation system can receive temperature and/or resistance measurements from a coupled thermistor. In another example, a coupled heater or cooler can include a temperature gauge, where the temperature regulation system can receive temperature measurements from the heater or cooler. In some cases, the temperature regulation system can store a log of temperature measurements for the fluid volume (e.g., on an hourly basis, etc.).

Air Temperature

The temperature regulation system can monitor the temperature of the ambient environment in proximity to the fluid repository (e.g., air temperature 330). For example, the temperature regulation system can electronically receive temperature measurements from an air temperature thermometer near the fluid repository. In some cases, the air temperature can be determined from an electronic weather forecast. The temperature regulation system can store a log of air temperature measurements for the fluid repository (e.g., on an hourly or daily basis, etc.).

Weather Forecast

The temperature regulation system can also monitor weather forecasts pertaining to a coupled fluid repository (e.g., weather forecast 335). For example, the control system can be in electronic communication with a weather forecast reporting system (e.g., the National Weather Service, WEATHER.COM®, and the like). Based on the geographical location of the coupled fluid repository (e.g., determined by GPS, IP address, user input, etc.), the temperature regulation system can receive (e.g., hourly, daily, etc.) a weather forecast for the location of the fluid repository (e.g., based on GPS, zip code, and the like). The forecast can include metrics such as air temperature, humidity levels, chance of rain, wind speed, anticipated solar radiation levels, and the like. The temperature regulation system can store these weather metrics for future analysis.

Figure 4A:
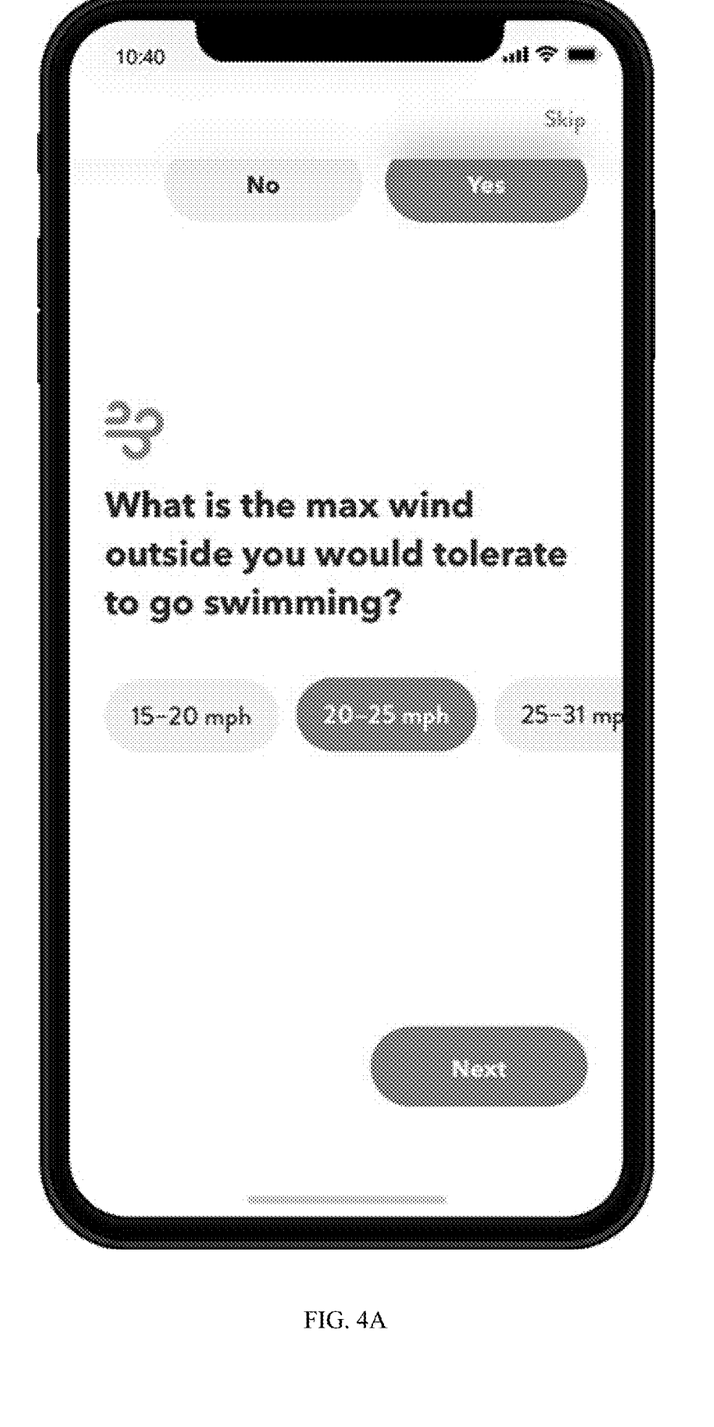
FIGS. 4A-4C provide screenshots of several user interview screens from Applicant's smartphone app that can be utilized to query and receive user input (e.g., at set up of the system).
Figure 4B:
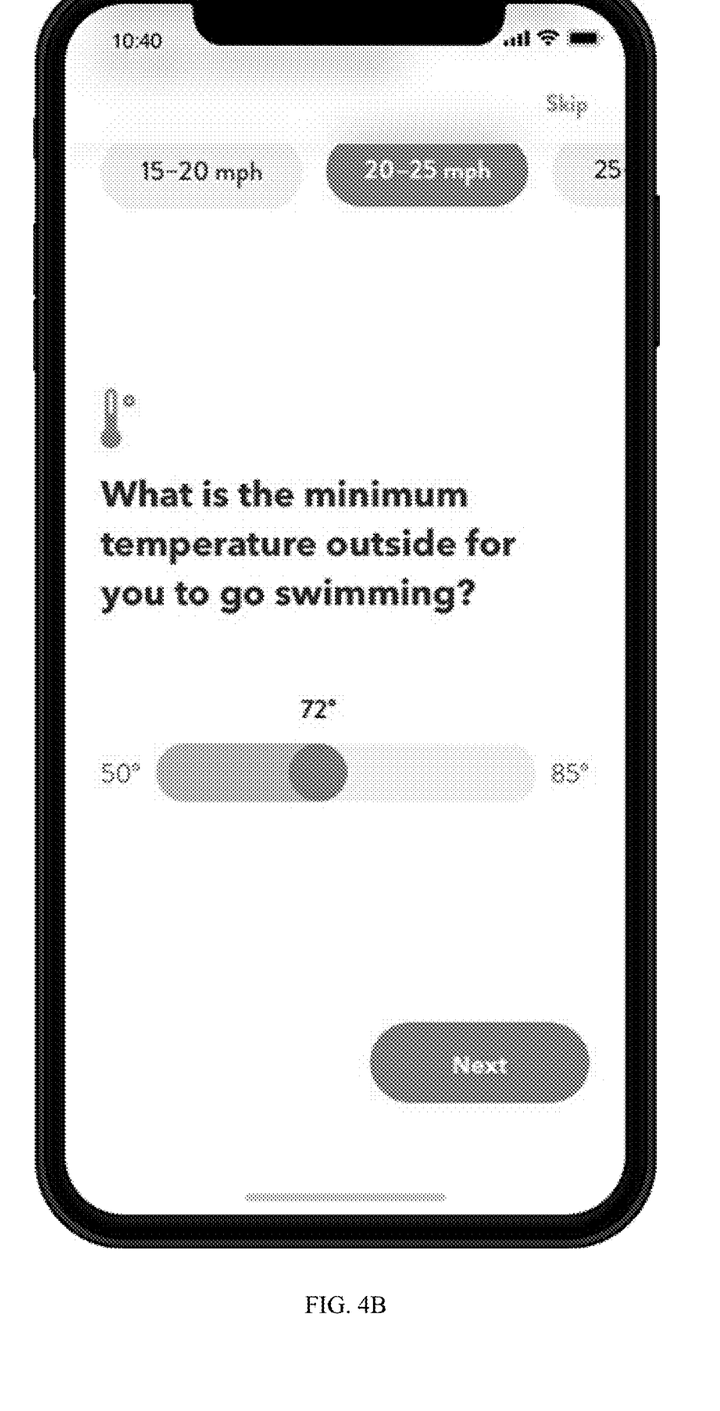
Figure 4C:
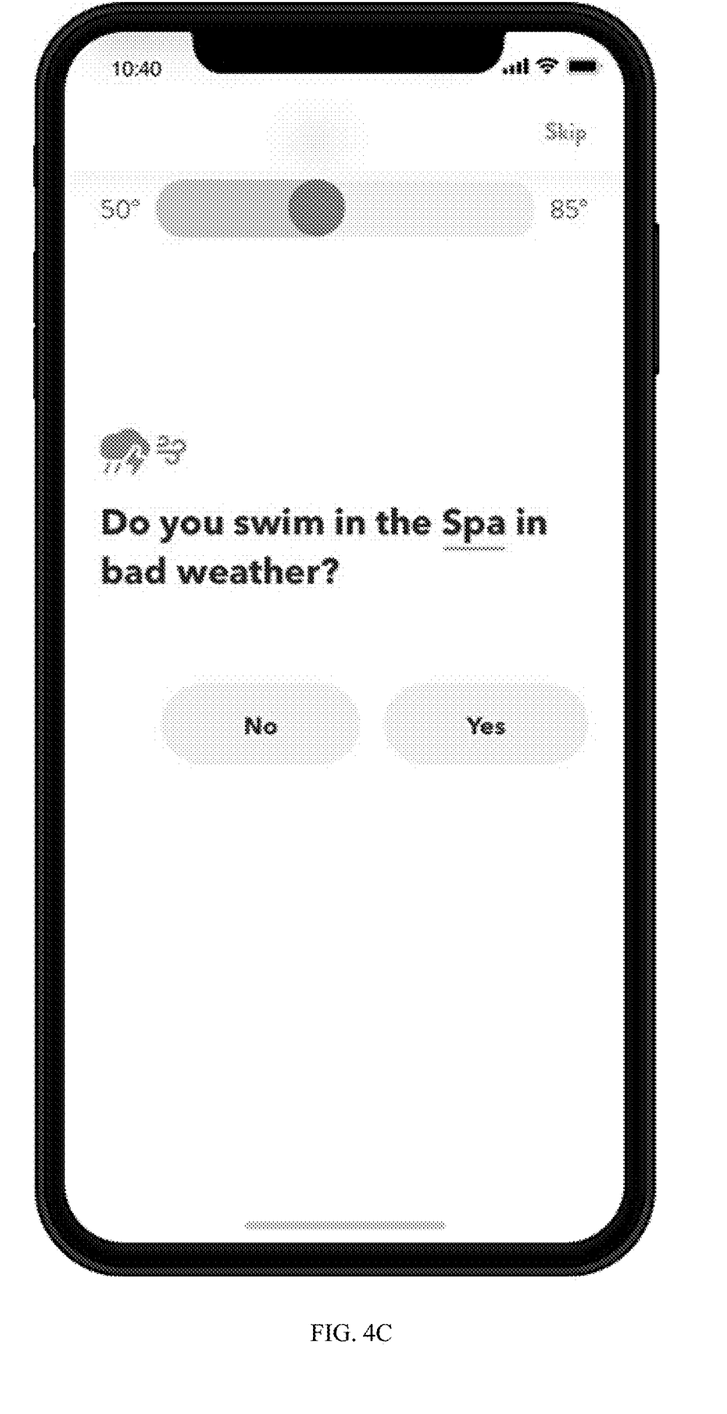

The weather forecast can be compared to previously specified user swimming preferences. FIGS. 4A-4C provide screenshots of several user interview screens from Applicant's smartphone app that can be utilized to query and receive user input (e.g., at set up of the system). For example, if the user indicates that she would not tolerate swimming in winds exceeding 25 MPH (FIG. 4A), ambient temperature below 72° F. (FIG. 4B), or in bad weather such as thunderstorms (FIG. 4C), the processor can assume that the user will not utilize the pool or spa when such conditions are forecast and control various components accordingly.

Fluid Volume

The temperature regulation system can determine a total volume of the fluid contained by a coupled fluid repository (e.g., fluid volume 340). For example, the control system can determine the fluid volume by user input, such as an estimated fluid volume and/or dimensions of the coupled fluid repository. In some cases, the control system can monitor how long it takes for the fluid volume to increase or decrease to a predefined temperature threshold, and based on thermal conductivity parameters of the corresponding heater or chiller, calculate the fluid volume. In some cases, the control system can adjust the fluid volume based on environmental factors, such as rain accumulation and evaporation (e.g., from a weather forecast).

User Schedule

The temperature regulation system can identify operation schedules water features (e.g., user schedule 345). For example, the control system can receive user input corresponding to use times for a coupled fluid repository. In some cases, the user input can include a desired state for the fluid repository. In some cases, the user input can include a calendar of future heating and cooling times for the fluid repository (e.g., time, day of week, etc.). In yet some other cases, the control system can determine a schedule of anticipated use times for the coupled fluid repository from previous heating and cooling periods for the repository.

The temperature regulation system can also identify deviations from a user schedule. For example, the user can grant location permissions on a smartphone app used to control the temperature regulation system. If the smartphone app determines that the user is more than a defined distance (e.g., 50 kilometers) from the coupled fluid repository, the temperature regulation system can refrain from heating and cooling periods notwithstanding the user schedule.

Desired Fluid Temperature

The temperature regulation system can also determine desired temperature values for the coupled fluid repository (e.g., desired fluid temperature 350). In some cases, the desired temperature values correspond to temperature values for when a user is using the fluid repository. The desired temperature values can be received (e.g., through user input), or the system can determine the temperature values (e.g., by monitoring the temperature values of the fluid repository when the repository is "in use").

Fluid Pump Parameters

The temperature regulation system can monitor operation parameters for the fluid flow pump. For example, the temperature regulation system can identify the fluid flow pump of the system. The control system can identify the pump through, for example, user input (e.g., make and model of the pump). The control system can identify operation parameters such as power output, rotations per minute (rpm), affinity curve, energy-expenditure rates, and the like, for the pump by searching a stored database or connecting electronically to an online or remote database. In some cases, the temperature regulation system can execute a calibration procedure to identify operation parameters for the fluid flow pump.

Utility Rates

The temperature regulation system can identify utility rates for the components of the system (e.g., utility rates 360). For example, the control system can electronically communicate with a utility rate notification website or service. The control system can receive utility rates for the geographical location which the temperature regulation system is located. The utility rates can be categorized by type of energy (electric, natural gas, and the like), the date, and/or the time of day. In some cases, the temperature regulation system can store these utility rates for future use.

Temperature Regulation Determination

The control system can facilitate the execution of a temperature regulation determination procedure for the temperature regulation system. The control system can monitor temperature-regulation factors such as those described with reference to FIG. 3 to generate a temperature regulation schedule for a coupled fluid repository. For example, the control system can determine a cost-optimal schedule to increasing or decreasing the temperature of the fluid volume to a predefined temperature threshold. The temperature threshold can include a user desired temperature when in use.

The control system can determine an anticipated use time of the fluid volume. The control system can monitor a user schedule of the fluid volume, which can include past use times and anticipated use times of the fluid repository.

The control system can also determine a current or anticipated initial temperature for the fluid volume. The initial temperature can include the temperature value at which the temperature regulation procedure will be initiated. The initial temperature can be measured (e.g., via a thermistor) or be determined through other factors (e.g., weather forecast, fluid volume, and the like).

The control system can generate a temperature regulation procedure for reaching the fluid volume from the initial temperature value to a user desired fluid temperature value. In some cases, the temperature regulation procedure can be generated to minimize a cost for reaching the user desired temperature. Other temperature-regulation factors, such as pump parameters, heater types and operating parameters, utility rates, and the like, can be monitored and calculated into the temperature regulation procedure. For example, a coupled solar heater can include a low use cost compared to a coupled electric heater. However, the solar heater efficiency can be dependent upon thermal conductivity parameters, previous weather forecast, and the like. Likewise, an electric heater may be more efficient compared to the solar heater in terms of thermal conductivity, but may cost more to operate on a per-minute basis (e.g., via energy rates) than the solar heater. The control system may take these factors into account in determining an optimal cost for reaching the fluid volume to the desired user temperature.

In some embodiments, the control system can calculate the effects of ambient conditions such as temperature and cloud cover and utilize those effects to calculate necessary heating. For example, the control system can determine over time that a pool will lose x temperature per hour when the ambient conditions are 70° F. and cloudy, but gain y temperature per hour when the ambient conditions are 90° F. and sunny. A different pool that has different properties (such as increased shading) may have a lower temperature gain z temperature per hour in the same ambient conditions of 90° F. and sunny. However, the control system can calculate historically-based effects for any pool without needing to know, e.g., whether the pool is shaded).

Performance Status Notification In some cases, the control system can transmit a temperature regulation status notification to a user. For example, the control system can notify a user of an anticipated temperature regulation procedure to be conducted for the fluid volume. The notification can be sent wirelessly, for example, through a user application to a variety of personal computing devices or mobile phones.

Multiple Fluid Repositories

In some cases, the temperature regulation system can be fluidically coupled to more than one fluid repository. For example, the temperature regulation system can be coupled to a pool basin and a spa basin. The temperature regulation system can generate temperature regulation procedures for each coupled fluid repository. For example, in some cases input fluid channels into each fluid repository can diverge from a single intake channel, and can be individually coupled or decoupled to fluid flow from the variable speed pump through a channel valve. The control system can be in electronic communication with the channel valve, and can execute activation cycles separately for each of the fluid repositories.

In some cases, a current fluid temperature of a first fluid volume contained by a coupled first fluid repository can be calculated and be included as a temperature regulation factor for a second fluid volume contained by a coupled second fluid repository. For example, a hot tub and a pool basin can be coupled to the temperature regulation system. The hot tub can include a high initial temperature compared to the pool water. As part of a generated temperature regulation schedule for the pool water, the temperature regulation system may determine to flow (e.g., via valve control and fluid flow pump control) hot tub water into the pool basin to increase the temperature of the pool water. In some cases, the temperature regulation system may determine to flow pool water into the spa, for example in order to decrease the temperature of the hot tub water.

Configurations

The temperature regulation system and techniques described herein, can be adaptable to the configurations of existing temperature regulation and fluid repository systems. For example, the control system can be configured to communicate with conventional variable speed pumps, flow rate sensors, valves, fluid channels, heater/coolers, thermistors, air thermometers, fluid repositories, and the like. Importantly, some temperature regulation systems can be retrofitted to execute the techniques described herein. For example, many conventional pool systems include a heater, a variable speed pump, a flow switch, and a pool basin. By implementing the techniques described herein, a temperature regulation system can effectively identify temperature regulation procedures through a new approach, while utilizing hardware already installed for the temperature regulation system. This can significantly decrease costs for pool owners, for example, by eliminating the needs for expensive installation costs and reducing renovation costs, as well as provide the owner with cost-effective techniques for regulating the temperature of a pool, spa, hot tub, and the like.

Further, as shown in the FIGS. and accompanying description, the system and techniques described herein can be adapted to a variety of pool, spa, or other fluid repository systems. While the FIGS. depict specific examples of configurations, one skilled in the art would understand that the maintenance system and associated techniques can be integrated into a multitude of fluid repository systems.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A system comprising:
   at least one temperature-regulation element configured for fluidic communication with a fluid repository containing a volume of fluid, wherein the at least one temperature-regulation element is configured to be in fluidic communication with an other fluid repository containing an other volume of fluid;
   a valve in fluidic communication with the fluid repository and the other fluid repository; and
   a processor in electronic communication with the at least one temperature-regulation element and the valve, the processor configured to:
      determine a temperature threshold value for the volume of fluid;
      calculate an amount of solar radiation to which the volume of fluid is exposed;
      calculate, from the amount of solar radiation and a set of temperature-regulation factors, a time period for reaching the temperature threshold value for the volume of fluid, wherein the set of temperature-regulation factors comprises at least a current temperature of the volume of fluid and an energy-transfer rate for the at least one temperature-regulation element;
      determine, from the set of temperature-regulation factors, a cost-optimal procedure for the at least one temperature-regulation element for reaching the temperature threshold value;
      determine an other time period for reaching another temperature threshold value for the other volume of fluid, wherein the activating the at least one temperature-regulation element is further according to the other time period;
      identify a desired use time for the volume of fluid;
      activate the at least one temperature-regulation element according to the time period, the desired use time, and the cost-optimal procedure;
      identify a temperature difference between the volume of fluid and the other volume of fluid; and
      actuate the valve for reaching the temperature threshold value, the other temperature threshold value, or both to:
         flow fluid from the volume of fluid into the other volume of fluid based on the temperature difference; or
         flow fluid from the other fluid repository to the fluid repository based on the temperature difference.

2. The system of claim 1, further comprising a fluid flow pump in fluidic communication with the temperature-regulation element, and in electronic communication with the processor, wherein the set of temperature-regulation factors further comprises a power output value or rotations per minute value of the fluid flow pump, wherein the processor is further configured to activate the fluid flow pump according to the time period and the desired use time.

3. The system of claim 2, wherein the set of temperature-regulation factors further comprises an operating condition of the fluid flow pump, wherein the processor is further configured to determine a degradation of the operating condition of the fluid flow pump.

4. The system of claim 1, wherein the at least one temperature-regulation element comprises a gas heater, an electric heater, a solar heater, an electric chiller, or a combination thereof.

5. The system of claim 4, wherein the at least one temperature-regulation element comprises at least two temperature-regulation elements, and wherein the set of temperature-regulation factors further comprises an energy-transfer rate for each of the temperature-regulation elements, and an energy-expenditure rate for operating each of the temperature-regulation elements.

6. The system of claim 5, wherein the processor is further configured to activate a subset of the at least two temperature-regulation elements according to the time period and the desired use time.

7. The system of claim 1, wherein the processor is further configured to:
   receive an electronic weather forecast; and
   calculate the amount of solar radiation from the electronic weather forecast.

8. The system of claim 1, further comprising a temperature gauge in electronic communication with the processor, wherein the set of temperature-regulation factors further comprises ambient temperature factors, wherein the processor is further configured to:
   receive temperature measurements from the temperature gauge; and
   determine the ambient temperature factors from the temperature measurements.

9. The system of claim 8, wherein the processor is further configured to determine a schedule of ambient temperature factors over a predefined period of time from the temperature measurements.

10. The system of claim 1, wherein the processor is further configured to:
    determine a set of active use mitigation factors for the volume of fluid; wherein the identifying the desired use time is further according to the set of active use mitigation factors.

11. The system of claim 10, wherein the set of active use mitigation factors comprises a predefined geographical distance, wherein the processor is further configured to determine a user is a predefined geographical distance from the fluid repository.

12. The system of claim 10, wherein the set of active use mitigation factors comprises an active use schedule for the fluid repository and configured by a user, and wherein the processor is further configured to determine an inactive schedule for the fluid repository from the active use schedule.

13. The system of claim 10, wherein the set of active use mitigation factors further comprises inclement weather conditions, wherein the processor is further configured to:
    receive an electronic weather forecast; and
    determine the inclement weather conditions from the electronic weather forecast.

14. The system of claim 13, wherein the inclement weather conditions are determined relative to previously submitted user preferences.

15. The system of claim 1, wherein the set of temperature-regulation factors further comprises a schedule of energy rate pricing for a property on which the system resides, wherein the processor is further configured to receive the schedule of energy rate pricing electronically.

* * * * *